Nov. 26, 1963     O. C. NIEDERER     3,112,003
BATTERY CLAMPING MECHANISM
Filed Aug. 31, 1960     2 Sheets-Sheet 1
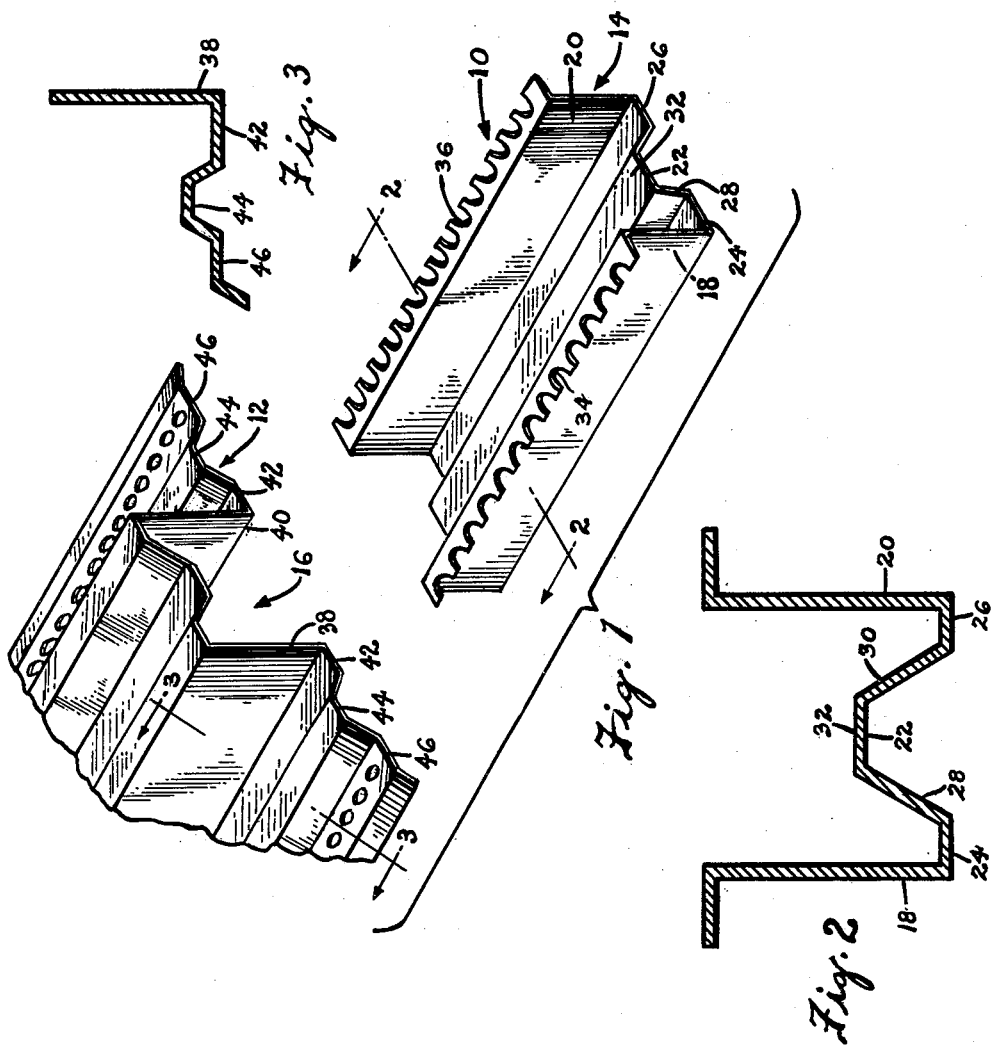
INVENTOR.
OTTO CHRISTOPHER NIEDERER
BY
Lawrence S. Epstein
ATTORNEYS Nov. 26, 1963　　O. C. NIEDERER　　3,112,003
BATTERY CLAMPING MECHANISM
Filed Aug. 31, 1960　　2 Sheets-Sheet 2

INVENTOR.
OTTO CHRISTOPHER NIEDERER
BY
Lawrence S. Epstein
ATTORNEYS

United States Patent Office 3,112,003
Patented Nov. 26, 1963

3,112,003
BATTERY CLAMPING MECHANISM
Otto C. Niederer, Westfield, N.J., assignor, by mesne assignments, to the United States of America as represented by the Secretary of the Navy
Filed Aug. 31, 1960, Ser. No. 53,321
2 Claims. (Cl. 180—68.5)

The instant invention relates to improvements in battery covers and is particularly directed towards a particular type of clamping mechanism for holding an array of batteries in place.

This battery clamping mechanism is intended for use in the submarine simulator decoy which is the subject of a co-pending application, Serial No. 84,467 filed January 23, 1961, for holding the batteries which are the source of power for this device.

Although the instant invention is utilized in a submarine decoy device the novel method and structure may be applied to clamping other types of batteries and sources of power.

It is an object of this invention to provide an improved battery clamping device.

It is a further object of this invention to provide an improved battery clamping device for underwater operation.

Another object of this invention is the method of making a battery clamping mechanism.

A further object of this invention is to provide an improved battery clamping structure which is light in weight, offers complete insulation, does not absorb water and provides a cable conduit.

Other objects and many of the attendant advantages of this invention will be readily appreciated as the same becomes better understood by reference to the following detailed description when considered in connection with the accompanying drawings wherein:

FIG. 1 is a perspective view of the improved clamp-down holding device;

FIG. 2 is a section taken on line 2—2 of FIG. 1;

FIG. 3 is a section taken on line 3—3 of FIG. 1; and

Figure 4:
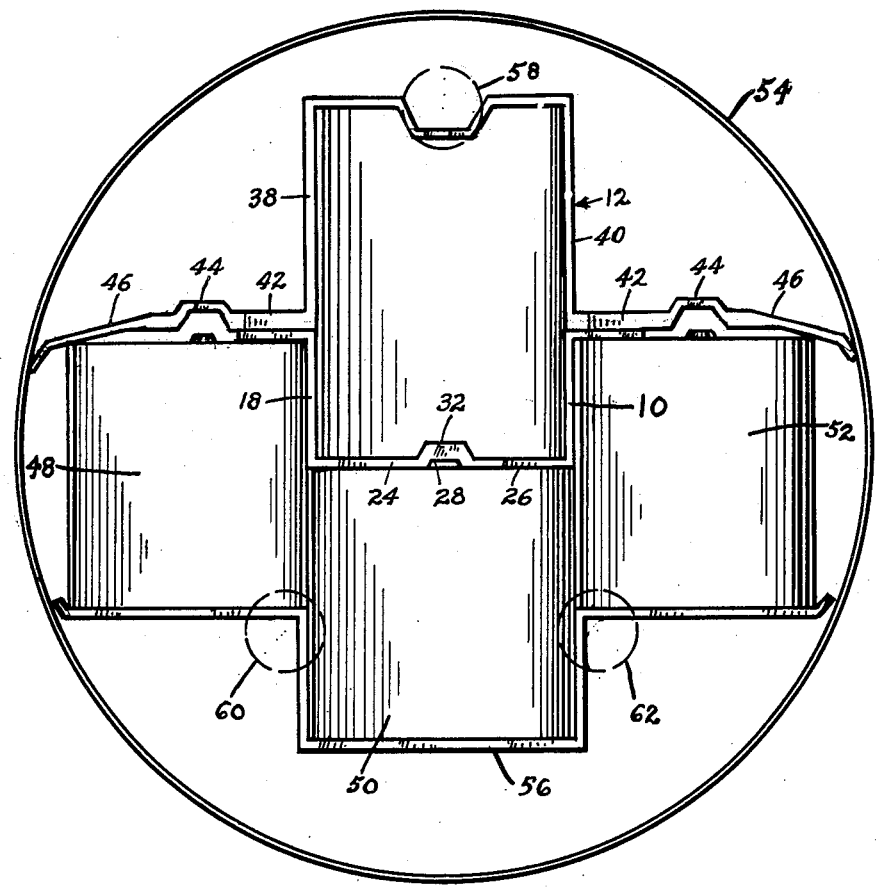
FIG. 4 is an end view of the battery clamping mechanism shown mounted within the hull member in position with batteries.

Referring now to the figures, numeral 10 indicates one part of the two-part battery clamp and numeral 12 indicates the other part of the two-part clamping device. Part 10 fits between two arrays of battery cells and part 12 fits over part 10 and over each of the tops of the battery arrays. The space formed by the depression 14 of part 10 and the raised portion 16 of part 12 serves as a battery cable conduit. Part 10 is complementary to the size and shape of the battery box. It comprises two sides 18 and 20 connected by an angle bar 22. Said angular connecting bar 22 comprises two flange sections 24 and 26 which are planar and are respectively connected to each of said sides 18 and 20. Two angular flanges 28 and 30 are connected to a common section 32 and respectively connected to each of the horizontal flange sections 24 and 26. The vertical sides 18 and 20 are adapted to abut against the sides respectively of the battery boxes. Each of the sides has a horizontal flange section, 34 and 36 respectively, with a serrated edge for attaching to the binding posts of the battery box. The top section 12 has an angled opening 16 which is the complement of the angled opening 14 of part 10. Each of the sides, 38 and 40, of the top section has a horizontal flange section 42 and an angular overpass section 44 to cover the binding posts of the battery boxes and an angled shielding section 46 which protects the battery connections from the metallic sides of the simulator. Holes are formed in the angled shield section 46 for connecting the top piece 12 to the battery boxes. FIGS. 2 and 3 show a cross-sectional view of parts 10 and 12 with the requisite angles.

A primary function of the clamp-down device is to prevent the displacement of batteries from a desired position. The longitudinal hollow portion formed by parts 10 and 12 serves as an insulated conduit for heavy power cables. The side angle shields of part 12 provide insulation for the outside battery terminals. The entire hold-down device comprising parts 10 and 12 forms an insulator which will not absorb water in humid areas in which the device will operate. Prior to the use of this hold-down device wooden blocks with insulating material were used to hold the batteries in place. These wooden blocks had the disadvantage of being too heavy, absorbing moisture and providing no conduit for the cables.

The material used for the hold-down device comprises five layers of glass cloth. The cloth used in one embodiment of the invention was .015 inch thick. The cloth is impregnated with a resin. One such resin which has been used successfully in a preferred embodiment is a polyester type known as Glidpol 1,001. Other polyester or epoxy resins which have similar characteristics may be used. The other materials which are required to form the battery retainer are a catalyst which is 60% methyl ethyl-ketone peroxide in di-methyl phthalate; and an accelerator to promote rapid setting. Such an accelerator which has been used in a preferred embodiment is cobalt napthenate in a 2% solution. The method of making the battery clamp-down device is as follows: a mold of the shape required is formed in the usual method. The material for the mold may be of any stable type, preferably wood. The glass cloth is then formed over one part of the mold and impregnated with the resin and the catalyst and accelerator added in the usual manner. Then the subsequent layers are placed over the first layer and the resin catalyst and accelerator added for each layer. The mating portion of the mold is then placed over the combination of layers and clamped into place for a period of approximately 2 hours. When the mold is removed the structure is formed in a stable, glass fiber cloth impregnated resin structure as shown in FIGS. 1 and 2.

FIG. 4 shows the battery retainer utilized in clamping three arrays of battery cells 48, 50, and 52 respectively within hull section 54. Tray 56 which is made of the same material as sections 10 and 12 is utilized as a tray for battery cell arrays 48, 50, and 52. Tie rods and washers 58, 60, and 62 clamp the battery cells and clamp down retainers to form a rigid mass which is wedged within hull section 54.

Obviously many modifications and variations of the present invention are possible in the light of the above teachings. It is therefore to be understood that within the scope of the appended claims the invention may be practiced otherwise than as specifically described.

What is claimed is:

1. A battery hold-down structure comprising a first piece and a second piece, said first and second pieces forming a closed structure of plastic material, the first of said pieces having horizontal flanges and vertical sides to form a shape like a capital W with a flattened center when viewed on end, said vertical sides of said first piece being adapted to abut against the sides of battery boxes and said horizontal flanges of said first piece being adapted to bear against the top surface of battery boxes, the second of said pieces being shaped like an inverted capital W with a flattened center when viewed on end, said second piece having additional angular pieces attached to each serif, said second piece being adapted to mate with the top of the battery boxes and said first piece, whereby said first and second pieces form an insulated conduit for power cables, and a third tray structure of plastic material cooperating with said first and second plastic structures and tie rod bolts connected thereto for clamping of the entire structure and battery boxes, whereby said battery boxes form a rigid mass and are shielded from contact with any metallic object, said first and second pieces cooperating with hold-down bolts on said battery boxes.

2. The combination of claim 1 wherein said first piece and said second piece are complementary shapes, said pieces adapted to be formed by the same mold.

References Cited in the file of this patent

UNITED STATES PATENTS

| | | |
|---|---|---|
| 712,814 | Lake | Nov. 4, 1902 |
| 1,424,144 | Kunkel | July 25, 1922 |
| 1,611,519 | Franklin | Dec. 21, 1926 |
| 2,022,595 | Gowing | Nov. 26, 1935 |
| 2,094,329 | Mascuch | Sept. 28, 1937 |
| 2,159,890 | Ferguson | May 23, 1939 |
| 2,213,010 | MacPherson | Aug. 27, 1940 |
| 2,710,660 | Coleman | June 14, 1955 |
| 2,845,379 | Bey | July 29, 1958 |
| 2,958,621 | Freeman et al. | Nov. 1, 1960 |

FOREIGN PATENTS

| | | |
|---|---|---|
| 1,011,256 | France | Apr. 2, 1952 |